July 27, 1971  J. L. MAHER  3,595,777

METHOD AND MEANS FOR DEHYDRATING A MIXTURE OF FLUIDS

Filed May 19, 1969  2 Sheets-Sheet 1

INVENTOR.
JOSEPH L. MAHER

Arthur L. Wade

ATTORNEY

INVENTOR.
JOSEPH L. MAHER

ATTORNEY

United States Patent Office 3,595,777
Patented July 27, 1971

3,595,777
METHOD AND MEANS FOR DEHYDRATING A MIXTURE OF FLUIDS
Joseph L. Maher, Tulsa, Okla., assignor to Combustion Engineering, Inc., New York, N.Y.
Filed May 19, 1969, Ser. No. 825,727
Int. Cl. C10g 7/04
U.S. Cl. 208—187                                    4 Claims

ABSTRACT OF THE DISCLOSURE

A vessel receives a fluid mixture to process the mixture. Removal of the processed fluids is carried out with a pressure reduction. A vapor is evolved from the mixture and compressed and mixed with the fluid mixture received by the vessel to raise the enthalpy of the mixture to carry out the process in the vessel.

BACKGROUND OF THE INVENTION (1) Field of the invention

The present invention relates to generating heat by compression of a vaporized component of a fluid mixture and reabsorbing at least a portion of the compressed vapor into the mixture to heat the mixture. More particularly, the heat generated by compression is transferred to the mixture in two parts: The sensible heat and the latent heat of condensation.

(2) Description of the prior art

Heat is a basic requirement to carry out a wide range of processes on fluids. Representative of these processes is the dehydration of liquids produced by oil wells.

The generation of heat can be expensive. The casual observer often concludes that gas is available to be burned near an oil well and the oil produced can also be burned. However, gas is often not produced and if it is produced, it may be unsuitable for a number of reasons. Also, the produced oil may be unsatisfactory for fuel.

The generation of heat by combustion around oil production is hazardous. Fired equipment is usually isolated as much as possible. On the small platforms offshore, this hazard is intensified by the proximity of equipment to each other.

The search continues for economical, available, and non-hazardous sources of heat for the oil field. With electric power increasingly available to the oil field, the transduction of this source of power into heat is considered. The direct conversion by resistance is inefficient. However, the increase in enthalpy furnished by an electric-driven compressor on a vaporizable portion of the oil well production could be the basis for a breakthrough in this problem area.

SUMMARY OF THE INVENTION

A principal object of the invention is to compress the vaporized component of a mixture of liquids and to absorb at least a part of the compressed vapor back into the mixture to recover the enthalpy furnished by the compressor as heat.

Another object is to compress the vapor from a low-pressure crude oil-separation and to recycle the compressed vapor to the crude oil at a higher pressure where the compressed vapor will be absorbed into the crude oil.

Another object is to absorb the compressed vapor from a low-pressure crude-oil separation into the crude oil at a higher pressure and strip the oil stream in a low-pressure contactor with vapor rejected at the higher pressure level.

The present invention contemplates absorbing a compressed, condensable vapor in a liquid requiring heat for processing purposes at a first pressure level and subsequent to the heat processing, reducing the pressure to a second level at which the absorbed condensate vaporizes to be recompressed and recycled to continually supply heat for the process.

The invention further contemplates the condensable-vaporizable liquid being selected from a range of light hydrocarbons and absorbed in oil well production to provide heat to dehydrate the production.

Other objects, advantages and features of this invention will become apparent to one skilled in the art upon consideration of the written specification, appended claims, and attached drawings, wherein;

DESCRIPTION OF THE PREFERRED EMBODIMENT

Basic process concept

The basic concept of the present invention is embodied in the process of compressing vapor discharged from a low pressure crude oil-vapor separation and recycling this compressed vapor so all, or a part, of the compressed vapor is absorbed by the crude oil as it is produced at a relatively high pressure. The increase in enthalpy furnished by the compressor is recovered as heat in the mixture of crude oil and compressed vapor.

Some gas is separated from the crude oil at the higher pressure. A portion of this rejected, high pressure gas may be used to strip the crude oil during the low pressure crude oil-vapor separation of the vapor which is compressed and recycled.

The absorption of the compressed vapor heats the crude oil to facilitate dehydration. The subsequent vaporization at the low pressure cools the dehydrated crude oil.

Basic structural embodiment

Figure 1:
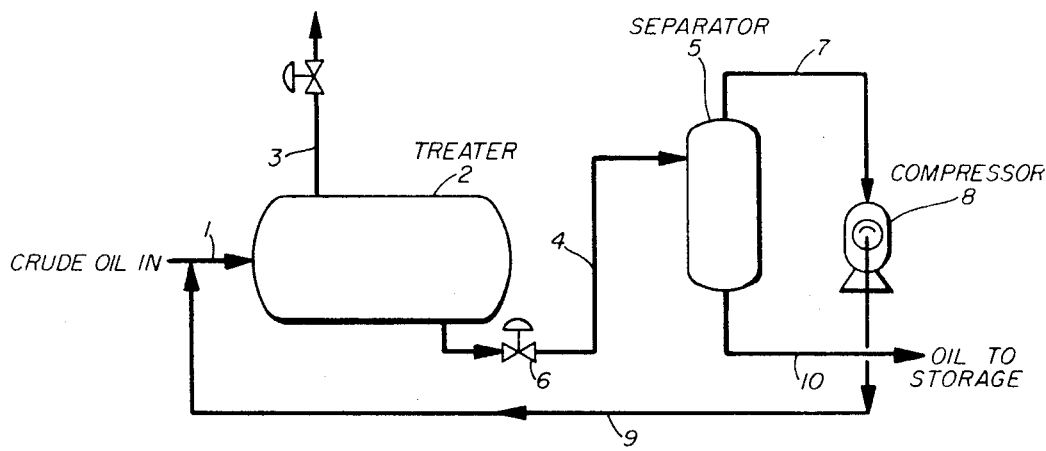
FIG. 1 is a flow diagram disclosing the basic units of a system in which the present invention is embodied.

FIG. 1 is a flow diagram which serves to illustrate the basic structure with which the novel process can be carried out. The crude oil flows into the system through conduit 1. The crude oil stream is transferred with conduit 1 into treater vessel 2 at the relatively high pressure of its production from the well. The compressed vapor is mixed with the crude oil stream just prior to the stream entering vessel 2 and is condensed and absorbed.

Gas which is produced with the crude oil is separated in the heating section of treater vessel 2, and this gas is withdrawn with conduit 3. The emulsion of crude oil and produced water is broken by the heat of the compressed vapor and coalescence of the water of the broken emulsion is provided. The water is discharged from vessel 2 and the dehydrated oil from the treater is transferred with conduit 4 to low pressure separator vessel 5.

Separator vessel 5 receives the treated oil at a relatively low pressure. A pressure drop is taken across valve 6 in conduit 4. At the lower pressure in separator vessel 5, the condensed and absorbed diluent revaporizes and is withdrawn with conduit 7. Compressor 8 again compresses the diluent vapor and conduit 9 transfers it to the incoming crude oil of conduit 1.

The heat of vaporization is removed from vessel 5 with the diluent vapor withdrawn with conduit 7. The dehydrated crude oil, cooled by this removal of heat, is withdrawn with conduit 10. If desirable, a portion of the flashed gas of conduit 3 can be used in separator vessel 5 to strip the diluent from the crude oil.

The recycled compressed vapor as a diluent

The recycle stream, the diluent vapor compressed by compressor 8 and returned from separator vessel 5 to the incoming crude oil stream, can be referred to as a diluent. This diluent is absorbed in the crude oil stream. If not all of the diluent is absorbed, it passes out conduit 3 as vapor along with flashed gas.

The recycled diluent should have a component make-up that condenses in the crude oil and gives up both sensible and latent heat. Methane and other light components that will not condense and absorb in the crude oil give up only sensible heat to the crude. Also, the power needed to compress the vapor of conduit 7 is less for a higher molecular weight material than for a lower molecular weight material. A bonus in addition to the heating capacity and power efficiency is in the lowered viscosity of the crude in treater 4 which facilitates coalescence of water from the crude.

A clear example of a satisfactory diluent is found where the crude oil has a high content of those intermediate hydrocarbons $C_5$, $C_6$ that are good diluent materials, and that tend to vaporize and build up in the recycle. For such a crude, the "natural" recycle of FIG. 1 is all that is required to produce a satisfactory rise in temperature in the treater 2.

The first separation of vapor would take place in the heating section of treater vessel 2 and the second takes place in the separator vessel 5. Only simple flashes take place; single equilibrium stages.

Forced recycle

The simple embodiment of the invention, disclosed in FIG. 1, uses what is termed the "natural" recycle. If the crude oil processed contains a diluent of satisfactory composition and quantity, the advantages of the invention will be obtained. However, an additional force may be required to build up the quantity of diluent for recycle to obtain the required temperature rise in the treater.

The force required is obtained by employing a portion of the gas separated from the crude before the treating step and using it in the low-pressure separator vessel 5 as a stripping agent. This stripping gas, plus the stripped vapor, comprises the recycle of diluent. Additional simple internal structures will be required in separator vessel 5 to assure good contact between the liquid and gas, but this single equilibrium stage will be sufficient.

Figure 2:
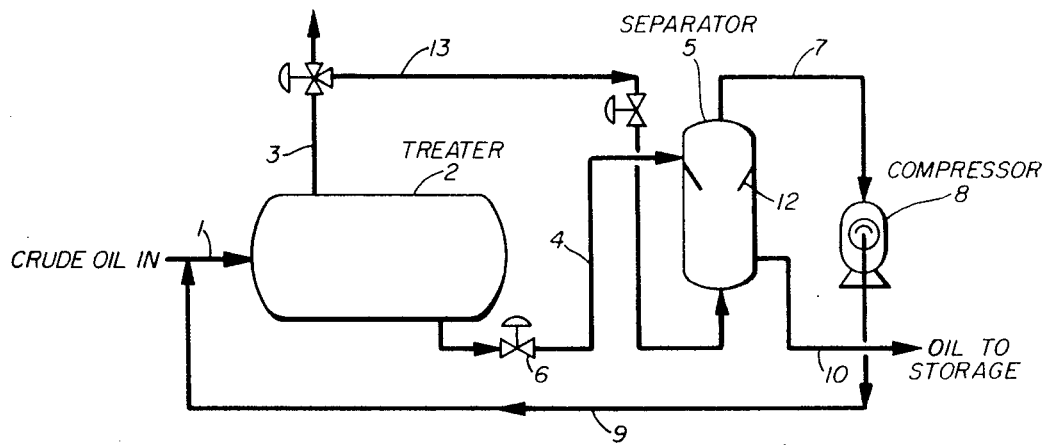
FIG. 2 is a flow diagram similar to that of FIG. 1 but with the addition of a circuit to employ a stripping vapor for the low pressure separator.

FIG. 2 discloses the combination of the FIG. 1 structure with additional contact structure 12 indicated in separator 5 and conduit 13 arranged to remove a portion of the gas separated from the crude in treater 2 and inserting it in separator 5. This gas, now a stripping agent in separator 5, is combined with a vapor stripped to comprise the recycle of diluent.

Figure 3:
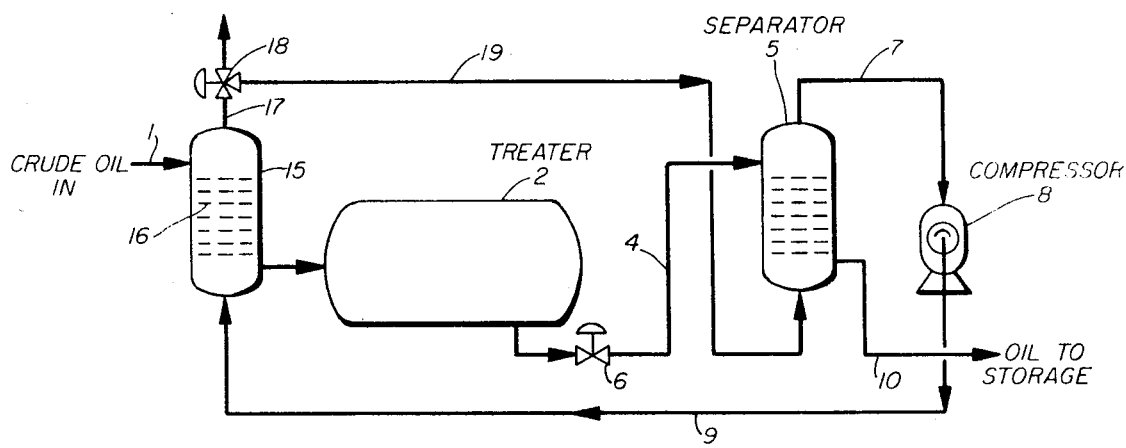
FIG. 3 is similar to the foregoing diagrams but including an additional absorber vessel to facilitate contact of the compressed vapors with the incoming crude oil.

Referring to FIG. 3, the system disclosed is a combination of the FIG. 2 structure with additional absorber vessel 15 connected to receive the crude oil initially and the recycle diluent for delivery to treater 2. As with FIG. 2, the absorber vessel 15 has internals 16 indicated therein. These internals are formed to facilitate contact of the fluids therein in multistage countercurrent flow. The effect of this contact in vessel 15 is a richer diluent recycle which can be recovered with less stripping gas.

Also, in the system of FIG. 3, gas from the flash in vessel 15 is removed by conduit 17 and valve 18 used to control a portion transported by conduit 19 to separator vessel 5 to assist the stripping of the diluent from the oil. The connection of this conduit 19 is to be compared with conduit 13 in the preceding disclosures. The flash taken is in vessel 15 rather than in the heating section of the treater.

Figure 4:
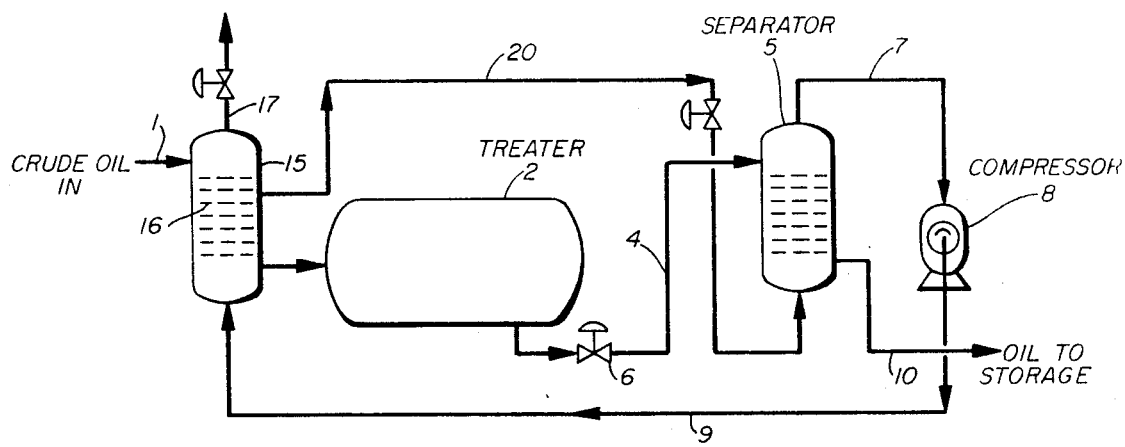
FIG. 4 is similar to FIG. 3 but removing the stripping vapor at an earlier stage in the high pressure absorbing vessel.

FIG. 4 discloses the combination of the FIG. 3 structure wherein a portion of the vapor from a lower stage in the absorber vessel 15 is removed through conduit 20 for use as the stripping vapor. The remaining vapor passes up the column of the vessel 15, desorbing most of the methane contained in the original crude oil. In this way a heavier, more effective recycle is built up.

Each of the processes of FIGS. 1–4 will have its own application, depending on the nature of the crude oil to be treated. For a very light oil possessing high $C_3$–$C_6$ content the natural recycle of FIG. 1 will suffice. For a somewhat heavier crude oil, some stripping will be required, as in FIG. 2. For a heavy oil, with small diluent content, the absorber-stripper method of FIG. 3 or FIG. 4 will be necessary.

From the foregoing it will further be seen that this invention is one well adapted to attain all of the ends and objects hereinabove set forth, together with other advantages which are obvious and inherent.

It will be understood that certain features and subcombinations are of utility and may be employed without reference to other features and subcombinations. Many possible embodiments may be made of the invention without departing from the scope thereof.

The invention having been described, what is claimed is:

1. A method of dehydrating a mixture of hydrocarbon fluids and water, including,
    contacting intimately in an absorption zone a stream of the mixture of hydrocarbon fluids and water and a stream of heated hydrocarbon vapor of low methane content to heat the fluid mixture and absorb a portion of the lighter ends of the hydrocarbon fluids into the portion of the vapor not passing into solution with the mixture,
    removing the mixture of hydrocarbon fluids and water so contacted to a treating zone and coalescing the water, separating the water and dehydrated hydrocarbon fluids,
    reducing the pressure on the dehydrated hydrocarbon fluids upon their discharge from the treating zone to vaporize a portion of the fluids,
    separating the portion of the fluids vaporized by the pressure reduction from the remaining liquid components of the dehydrated hydrocarbon fluids,
    increasing the pressure of the vaporous components by compression to increase their enthalpy a predetermined amount,
    and introducing the compressed vapors into the absorption zone for heating of the incoming fluid mixture of hydrocarbons and water and for absorbing a portion of the lighter hydrocarbon ends.

2. The method of claim 1, including,
    removing hydrocarbon vapors from a predetermined stage of the absorption zone after utilizing the vapors as a heating agent and an absorbent,
    and introducing said vapors to the separation process to assist in the separation of the liquid and vapor components evolved from the hydrocarbon fluids by the pressure reduction process.

3. A dehydration system utilizing heat and pressure for a mixture of hydrocarbon fluids and water, including,
    an absorber vessel to receive the mixture of hydrocarbon fluids and water wherein intimate contact with a heated hydrocarbon vapor of low methane content is maintained to heat the fluid mixture and strip out a portion of the lighter ends of the hydrocarbon fluids,
    a treating vessel connected to the absorber vessel to receive and provide for the coalescence of water from the mixture of hydrocarbon fluids and water after contact with the hydrocarbon vapor, and to discharge water and dehydrated hydrocarbon fluids, a pressure-reducing means associated with the discharge of dehydrated hydrocarbon fluids from the treating vessel, such that the dehydrated hydrocarbon fluids discharged from the treating vessel experience a drop in pressure across the means and a portion of the fluids is vaporized, a relatively low pressure separator vessel connected to the treating vessel and the pressure-reducing means to receive and separate the vapor and liquid components of the dehydrated hydrocarbon fluids evolved by the pressure reduction, a compressor connected to the separator and receiving the vapor component therefrom to increase its pressure and raise its enthalpy a predetermined amount, and a compressor discharge line to return the compressed vapor to the absorber vessel to heat the incoming fluid mixture and strip the portion of the lighter hydrocarbon ends.

4. The system of claim 3, including, a connecting conduit between the absorber vessel and the separator vessel to conduct hydrocarbon vapors from a predetermined stage of the absorber vessel to the separation vessel.

References Cited

UNITED STATES PATENTS

| | | | |
|---|---|---|---|
| 1,307,280 | 6/1919 | Walker | 208—362 |
| 1,489,009 | 4/1924 | Rohmer et al. | 208—362 |
| 2,225,949 | 12/1940 | Bennett | 208—351 |
| 2,773,559 | 12/1956 | Cottle | 208—351 |
| 3,027,319 | 3/1962 | Meyer et al. | 208—370 |

HERBERT LEVINE, Primary Examiner

U.S. CL. X.R.

208—362, 364; 196—46, 136